United States Patent [19]
Sheely

[11] 3,783,528
[45] Jan. 8, 1974

[54] REACTOR STAGING
[75] Inventor: Harold R. Sheely, Newton, Mass.
[73] Assignee: The Badger Company, Inc., Cambridge, Mass.
[22] Filed: Jan. 5, 1971
[21] Appl. No.: 104,003

[52] U.S. Cl.................... 34/57 A, 432/58, 23/288 S
[51] Int. Cl............................................. F26b 17/10
[58] Field of Search.................... 34/10, 57 R, 57 A; 263/21 A; 432/15, 58

[56] References Cited
UNITED STATES PATENTS
2,655,273  10/1953  Snow ............................ 23/288 S X
2,750,681  6/1956  Berry ............................. 23/288 S X
2,581,134  1/1952  Odell ............................... 23/288 S Primary Examiner—William F. O'Dea
Assistant Examiner—William C. Anderson
Attorney—Schiller & Pandiscio

[57] ABSTRACT

Catalyst staging of a fluidized catalyst bed in a reactor is achieved by providing horizontal ridges or flanges which interrupt downward flow of catalyst as a dense layer along vertical interior surfaces of the reactor.

1 Claim, 5 Drawing Figures

HAROLD R. SHEELY
INVENTOR.

BY Schiller & Pandiscio
ATTORNEYS.

REACTOR STAGING

This invention relates to a process and apparatus for effecting intimate contact between gases and solids and in particular to improve fluidization of a mass of finely divided solids by means of a gasiform fluid.

The fluidized solids technique whereby a mass of finely divided solids is maintained in a state of controlled embullient motion by passage therethrough of a gaseous stream is well known and is employed in a variety of processes where it is essential or desirable to contact large volumes of gaseous substances with relatively large volumes of solid contact material under suitable conditions and relatively moderate flow velocities, e.g., in the range of 0.5 to 10 feet per second. The contact material is the finely divided fluidizable solid and, depending on the process, may or may not be a catalyst. The gaseous substances may be materials which are naturally in the gaseous state or vaporized fluids or mixtures thereof, and may include reactants as well as gases used merely for fluidizing purposes. The term "reactants" includes gases or vapors intended to enter into a reaction as well as fluids to be treated or used for physical purposes such as dilution, heat exchange, etc. Examples of operations conducted under fluidizing conditions are cracking, hydrogenation, reforming of naphthas, hydrodesulfurization, oxygenation, ammoxidation, oxychlorination, and absorption.

The primary object of this invention is to provide staging in a fluid bed reactor to prevent back-circulation of reaction products or effluent. It is well known, for example, that when a hydrocarbon vapor is passed upwardly through a fluidized bed of finely divided catalyst at a cracking temperature so that cracked products are formed, all of the products do not directly leave the catalyst bed. Instead a portion of the products is recirculated in the embullient motion in the bed and contacts the catalyst solids for a prolonged period of time. In other words, a substantial portion of hydrocarbon vapors and catalyst particles are recirculated back down through the bed. This back-circulation (also known as "back-flow" or "back-mixing") of reactions products and catalyst results in a prolonged contact time with the catalyst solids and thereby causes an excessive degradation into low-grade products such as coke and gas. This back circulation is particularly critical where the reaction process occurs stepwise, i.e., when the reaction process involves two or more successive reactions occurring in successive zones of the catalyst bed. For example, the production of acrylic acid from propylene in a fluid bed reactor involves the reaction of propylene and oxygen (usually in the form of air) to form acrolein and the reaction of acrolein with oxygen (air) and water to form acrylic acid (see U.S. Pat. No. 3, 475,488). The two reactions occur serially as the reactants flow upwardly in the fluidized catalyst bed. Unfortunately, the acrylic acid is unstable and if it is back-circulated it will readily oxidize and be degraded to undesirable products ($CO$, $CO_2$, $H_2O$, and even acetic acid). The prior art has long recognized the need for preventing back circulation of reaction products. For example, in the production of unsaturated nitriles as described in U.S. Pat. No. 3230246 and 3427343, it has been proposed to sub-divide the fluid bed reactor into a series of fluidized catalyst compartments by means of foraminous members or perforated trays stacked preferably so that the height of each compartment is no greater than about twice the diameter of the internal cross-section of the compartment. The reactor is in essence a multi-stage or staged reactor, comprising a sequence of continuous fluid beds. There also have been attempts to provide staging in a reactor by means of horizontal baffling. However, staging by means of trays, horizontal baffles, and similar devices in commercial size reactors is not fully satisfactory for reasons of cost, excessive resistance to flow of gases, clogging, catalyst classification, inadequate retardation of catalyst and vapor back-flow, and poor control of heat transfer and temperature.

Nevertheless, it is recognized that reactor staging offers the advantages of limited back-flow of vapors and catalyst, short average contact time, and more uniform contact of solids and fluids.

Accordingly, a more specific object of this invention is to provide new and improved means for providing staging in a fluid bed reactor. More particularly the object of this invention is to provide a method and means for staging the fluidized bed of a reactor so that objectionable back circulation of products is substantially eliminated or greatly reduced at relatively low cost and without materially increasing the resistance to gas flow through the reactor or reducing the through-put capacity of the reactor.

Described briefly, the invention consists of providing all interior vertical surfaces of the reactor with laterally projecting ridges or extensions which serve to interrupt downward vertical flow of catalyst particles. Other features and advantages of the invention are described or rendered obvious in the following description of the invention which is to be considered together with the drawings wherein.

I have determined that although the bed of catalyst particles in a fluid bed reactor is in constant agitation, there is a positive downward flow of catalyst on its vertical surfaces in the form of a dense layer measuring in the order of about one-half inch thick. This downward flow occurs even at relatively low gas flow velocities (i.e., less than about 0.5 feet per second) but more so at higher gas flow velocities. The downward flow of catalyst is continuous and occurs not only on the side walls of the reactor bed but also along other interior vertical surfaces such as the dip-legs of cyclones and vertical cooling or heating coils. This downward flow of catalyst produces back-mixing of products with reactants, as well as longer than expected contact times, with the result that undesirable secondary reactions or conditions are produced with a consequent drop in product yield. I have discovered that catalyst staging can be accomplished on an improved scale by providing short lateral extensions on the vertical surfaces of the reactor which interrupt the downward-flowing dense catalyst layer and direct it back into the main bed but offer minimum impedance to through flow of gases. The staging means may take various forms and the number required depends upon the height of the catalyst bed and the number of stages into which the bed is to be converted. In the use of the invention, standard practices of the fluidized bed technique are followed.

Figure 1:
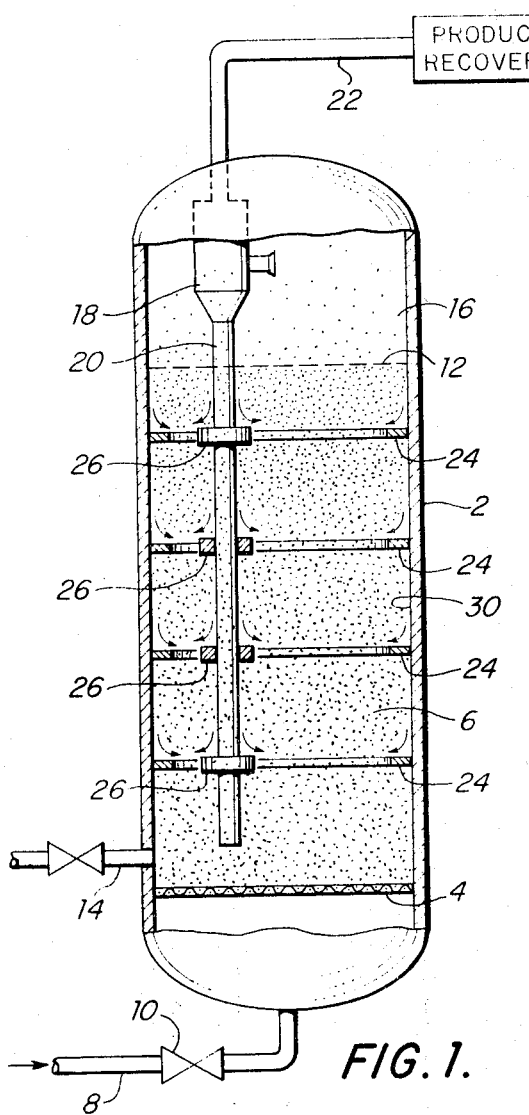
FIG. 1 is a section view in elevation of a reactor embodying a preferred form of the invention.

FIG. 1 illustrates a preferred embodiment of the invention in the form of a reactor 2 which may be used to carry out a variety of reaction processes. The reactor 2 contains at its bottom end a distribution grid 4 which may comprise a perforated plate or foraminous member or similar means adapted to act as a support for the bed of catalyst solids while providing a uniform flow of fluidizing and/or reactant gases into the catalyst bed. Supported on grid 4 is a bed of catalyst solids 6 in a fine state of subdivision. The bed is fluidized, i.e., maintained in a turbulant suspension, by introducing a fluid (which may or may not be a reactant) through a conduit 8 and a valve 10 at a velocity such that the solids on grid 4 undergo ebullient motion and assume the properties of a liquid having an upper level indicated at 12. One or more additional inlet conduits such as shown at 14 may be provided to introduce reactants to the catalyst bed. The catalyst bed is maintained at the level 12 so as to provide a disengaging zone 16 in which the catalyst particles are disengaged from the reactor effluent. A cyclone separator 18 is provided in the disengaging zone to separate catalyst fines entrained in the reactor effluent. The cyclone has a dip-leg 20 for returning the separated fines back to the catalyst bed. The effluent is removed from the reactor by means of a line 22 where the desired reaction product is recovered by any of the suitable methods known to persons skilled in the art, e.g., by scrubbing, distillation, absorption, etc. To the extent already described the reactor comprises a single fluidized catalyst bed and in the course of operation according to standard fluidization techniques, there is produced a dense downwardly moving layer of catalyst along the inner surface of the reactor and also along the outer surface of the dip-leg 20. As noted above, the downward moving layer generally has a thickness in the order of about one-half inch (the thickness is determined at least in part by the size of the reactor and the gas velocity) and thus, depending upon the rate of downward flow, a substantial amount of backflow of catalyst exists.

In accordance with this invention, the inner side surface of the reactor is provided with one or more internally projecting ridges or flanges 24 and the dip-leg 20 is correspondingly provided with one or more extended ridges or flanges 26. Preferably, the ridges or flanges 24 are continuous flat circular rings welded or otherwise suitably secured to the inner surface of the reactor, while the ridges or flanges 26 preferably are flat circular rings or discs secured by welding to the dip-legs. The ridges or flanges 24 and 26 should project radially at least one-half inch (and preferably about ½–2 inch) from the surfaces on which they are disposed. The radial dimension of the flange or ridge is its effective width. While it is possible to use ridges or flanges that project radially more than about two inches, there is no advantage to doing so with respect to achieving staging since the downward flowing catalyst layers never exceed about three-fourth inch in thickness. On the other hand, particularly with reactors having a diameter of 3 feet or less, it is common for the layer to be about one-fourth inch or less.

It is to be noted also that the greater the width of the flanges or ridges, the more they reduce the effective open space cross-sectional area of the reactor and increase the net resistance to flow of gases upwardly through the catalyst bed. Of course the larger the diameter of the reactor and the catalyst bed, the less a ridge or flange 24 of given width reduces the open space cross-sectional area and the less it impedes through flow of gases. Thus as a practical measure designed to assure optimum operation in the case of small diameter reactors, the width of the flanges or ridges should not be so great as to reduce the open space cross-sectional area of the reactor by more than about 10%. For convenience of illustration, flanges 26 are shown as being thicker (i.e., having a greater vertical dimension) than flanges 24. In practice, flanges 26 may have the same or a greater or smaller thickness than flanges 24. Essentially the thickness is a matter of choice but preferably is kept as small as possible without rendering the ridge or flange too weak to be self-supporting. The vertical spacing between the flanges or ridges on a given reaction surface also is a matter of choice, depending upon the amount of staging desired. In practice, however, it is preferred that phase separation of a catalyst bed into discrete layers or stages within the reactor be accomplished by using ridges or flanges spaced apart about no less than one inch and no greater than about three times the inside diameter of the reactor. Generally, the spacing will be 6–12 inches on reactors with diameters less than 3 feet, and 1–3 ft. on larger reactors. However, it is not necessary that the ridges or flanges be uniformly spaced, i.e., it is not necessary that the bed be divided into several stages of identical height.

With ridges or flanges disposed as shown at 24 and 26, the net downward flow of the dense catalyst layers along the reactor's vertical surfaces, i.e., the inside surface 30 of the reactor's side wall and the outside surface of dip-leg 20, is interrupted and the dense layers are directed inward as indicated schematically by the arrows in FIG. 1. The net result is that the catalyst bed 6 is subdivided into a plurality of highly stirred reaction zones or stages with the gases experiencing a brief contact time in each stage and with the product vapors and catalyst particles being substantially prevented from flowing from a higher zone down to a lower zone.

Figure 2:
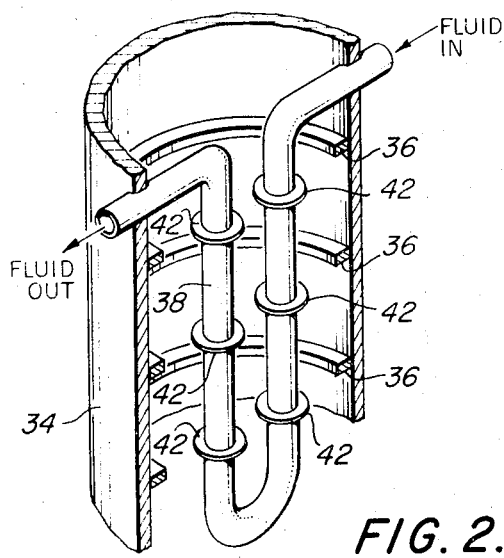
FIG. 2 is a fragmentary sectional view of another reactor.

An advantage of the invention is that it does not preclude or limit use of auxillary equipment within the reactor. Thus, for example, the reactor may include one or more heat exchangers of the type adapted to carry a suitable cooling or heating fluid, whereby the temperature of the catalyst bed is controlled. However, if the auxillary equipment introduces any additional vertical surfaces and such surfaces are of substantial length and expanse, then additional staging means may be used on such equipment. In this connection reference is had to FIG. 2 which is a perspective view of a section of a reactor vessel 34 similar to that of FIG. 1. The reactor vessel 34 includes staging means as hereinabove disclosed in the form of continuous flat rings or flanges 36. Additionally the reactor vessel includes a heat exchanger in the form of a coil 38 through which a cooling or heating fluid (as required by the reaction process going on in the reactor) is circulated. The coil 38 has vertical legs as shown. Assuming that the reactor 34 is filled with a catalyst bed fluidized as described in connection with FIG. 1, it will exhibit a downward flow of catalyst as a relatively thin but dense layer adjacent to and along the exterior surfaces of the vertical legs of coil 38. Therefore, in accordance with this invention, the vertical legs of coil 38 are provided with annular flanges or collars 42 which preferably are flat rings welded in place. Preferably collars 42 are disposed at the same levels and have the same thickness and width as flanges 36. Collars 42 interrupt the downflow of catalyst along the vertical legs of coil 38 and the flanges 36 act on catalyst flowing down along the inner surface of the reactor vessel's side wall in the same manner as the staging members 26 and 24 respectively of FIG. 1. Of course, more than one coil 38 may be used in the same reactor and the coils may be at the same or different levels. Furthermore the coils may consist of only one or more than two vertical legs. It is to be noted also that the phenomena of downward flow of catalyst in a fluidized bed also may exist along inclined surfaces. Therefore it is to be understood that as used herein the term "substantially vertical surface" means a vertical surface or an inclined surface which is sufficiently near to vertical for catalyst to flow downward therealong in a thin relatively dense layer as hereinabove described.

A further advantage of the invention is that it is applicable to reactors designed for sequential reactions as well as single reactions, and also to reactors having a quench zone or catalyst regeneration zone. Thus, for example, the invention may be used in the two-step process of converting propylene to acrolein to acrylic acid where both reaction steps are carried out in the same catalyst bed as noted above. The invention also may be used in one of the following processes where results are improved by having a quench zone in the catalyst bed to limit the reaction and prevent recycling of constituents absorbed on the catalyst particles: (1) production of ethylene dichloride from ethylene and chlorine, (2) conversion of anthracene to anthraquinone, and (3) conversion of naphthalene to phthalic anhydride. Reference may be had to U.S. Pat. No. 2783249 for further details of the above noted conversions of anthracene and naphthelene in a reactor having a quench zone.

Figure 3:
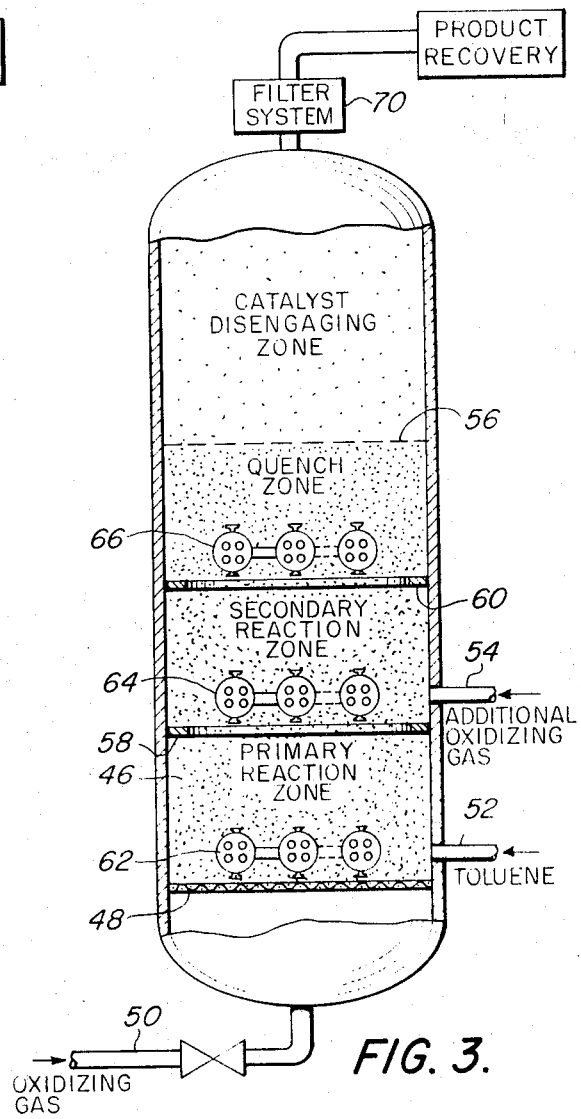
FIG. 3 is a view like FIG. 2 of a reactor involving more than one reaction zone.

Further by way of exemplifying application of the invention, reactor staging as herein provided may be used in a fluid bed reactor employed in producing maleic anhydride from an aromatic hydrocarbon such as toluene, with the reactor having a primary reaction zone maintained at a temperature at which the toluene side chain is oxidized to form benzaldehyde and benzoic acid and a secondary reaction zone in which maleic acid anhydride is formed through an oxidative rupture of the ring structure. Such a reactor is shown in FIG. 3 and comprises a cylindrical reactor vessel 44 having a catalyst bed 46 supported on a distribution grid 48. THe reactor has an oxidizing gas inlet supply pipe 50, a gasiform reactant inlet 52 through which toluene is supplied, and a second oxidizing gas inlet supply pipe 54. The bed 46 consists of catalyst particles of suitable composition and size, e.g., catalyst prepared in accordance with the teachings of U.S. Pat. No. 2,783,249 (see Example 2 thereof) and is fluidized by the oxidizing gas (which may be air or oxygen) to a bed height indicated by the broken line 56. The reactor vessel is provided with two internal circumferential ridges or flanges 58 and 60 which are spaced apart as shown. Ridges 58 and 60 are preferably formed as discrete flat rings and welded to the internal side surface of the reactor vessel. These ridges function as catalyst bed staging means as above described so that the catalyst bed has three stages, a primary reaction zone, a secondary reaction zone, and a quench zone. The space above the bed 46 is the catalyst disengaging zone where catalyst fines separate out from the reaction effluent under the influence of gravity. Essentially a dense phase catalyst bed extends from distribution grid 48 to the upper part of the quench zone. Temperature-control elements in the form of individually controlled U-tube heat exchangers represented schematically at 62, 64, and 66 are disposed horizontally in the catalyst bed at appropriate levels as shown to establish discrete temperature control in each zone as required to effect the primary or secondary oxidation reactions or reaction quenching. Any fines entrained in the effluent are removed by means of a filtering system 70. Of course the filter system may be replaced by a cyclone type separator.

Figures 4, 5:
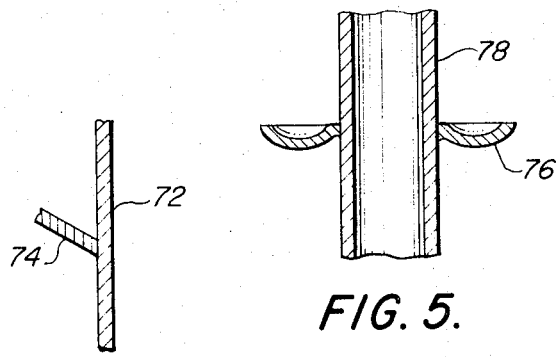
FIGS. 4 and 5 are fragmentary sectional views showing other forms of staging members embodying the present invention.

It is important to note that the invention is not limited to flat rings or flanges and that the staging elements need not be exactly horizontal but may slope. For example, as shown in FIG. 4, it is possible to use a staging element for the surface of a reactor wall 72 in the form of a ring 74 that is a section of a cone and is attached as shown so that its free edge is higher than its attached edge. A conical ring or disc also may be used as a staging element on a dip-leg or heating coil or other substantially vertical member located in the catalyst bed in spaced relation to the reactor's side wall. It also is contemplated that the staging element may have a curved e.g., concave, cross-sectional shape. FIG. 5 shows a staging element 76 of such shape attached to the vertical surface of a pipe 78 which could be a cyclone dipleg or part of a cooling or heating coil. Still other shapes obvious to persons skilled in the art may be used. The essential thing is that the staging element must extend laterally from the vertical surface to which it is secured, and its lateral extension must be sufficient to interrupt the downward flow of catalyst along that surface. As noted above, the staging member should extend laterally a distance preferably in the range of one-half to 2 inches.

Obviously, the invention is applicable generally to fluid bed reactors and fluid bed gas-solids-contacting apparatus since the staging which it provides is not dependent on the type of catalyst or the nature of the reactions or process involved. The size of the catalyst and the contact times and the linear gas velocities are selected in accordance with what has been determined to be best by persons skilled in the art for particular fluid catalyst reaction processes. Typically but not neccesarily, the invention is used in reactors having a catalyst size of 1–1,000 microns, an average contact time of 1–25 seconds, and gas velocities of 0.1 to 10.0 feet per second.

What is claimed is:

1. Apparatus comprising in combination a vertical elongate vessel adapted to contain a body of subdivided solids, means for introducing a stream of gas into the bottom of said vessel at a velocity sufficient to maintain said body of solids in a dense turbulent fluidized state, means for withdrawing a stream of gas from the upper portion of said vessel, and means for dividing said fluidized body into at least two stages with limited downflow of solids from a higher stage to a lower stage, said means comprising a plurality of substantially continuous ridges on an inner vertical surface of said vessel surrounding said body, said ridges being spaced along said vertical surface with the spacing of said ridges being in the range of 6 to 12 inches for a vessel internal diameter of up to 3 feet and in the range of 1 to 3 feet for a vessel internal diameter in excess of 3 feet, each of said ridges comprising a single substantially horizontally extending ring having one edge flush with said surface and another edge that projects from said surface a distance in the range of one-half to 2 inches sufficient for said ring to interrupt downflow of subdivided solids along said surface without materially increasing the resistance to gas flow through said vessel.

* * * * *